Jan. 27, 1970     R. B. BURDEN, JR., ET AL     3,491,708
WET WASTE DISPOSAL METHOD, APPARATUS AND COMPONENTS
Original Filed Aug. 7, 1967     2 Sheets-Sheet 1
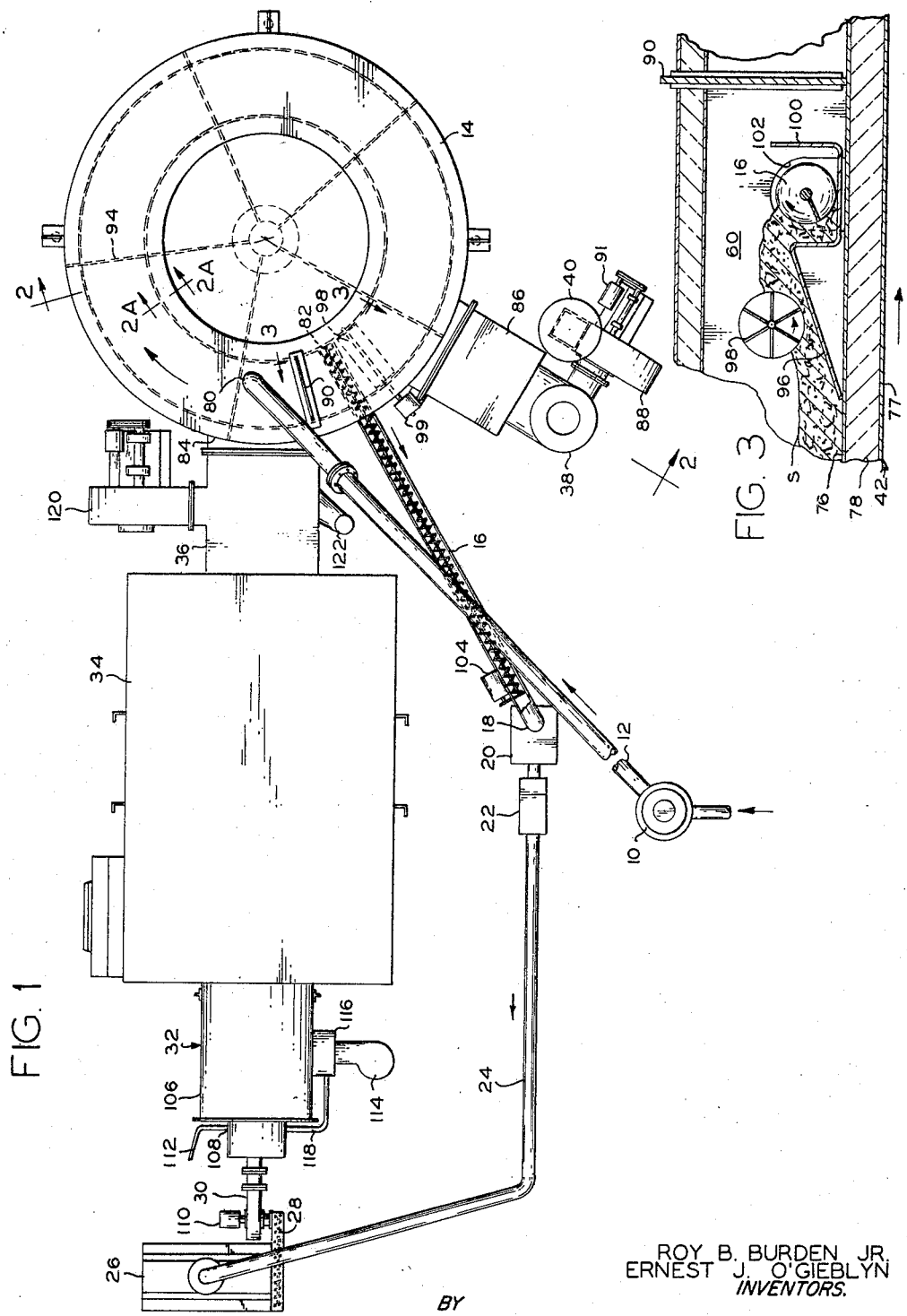
ROY B. BURDEN JR.
ERNEST J. O'GIEBLYN
*INVENTORS.*
BY
BUCKHORN, BLORE, KLARQUIST & SPARKMAN
*ATTORNEYS*

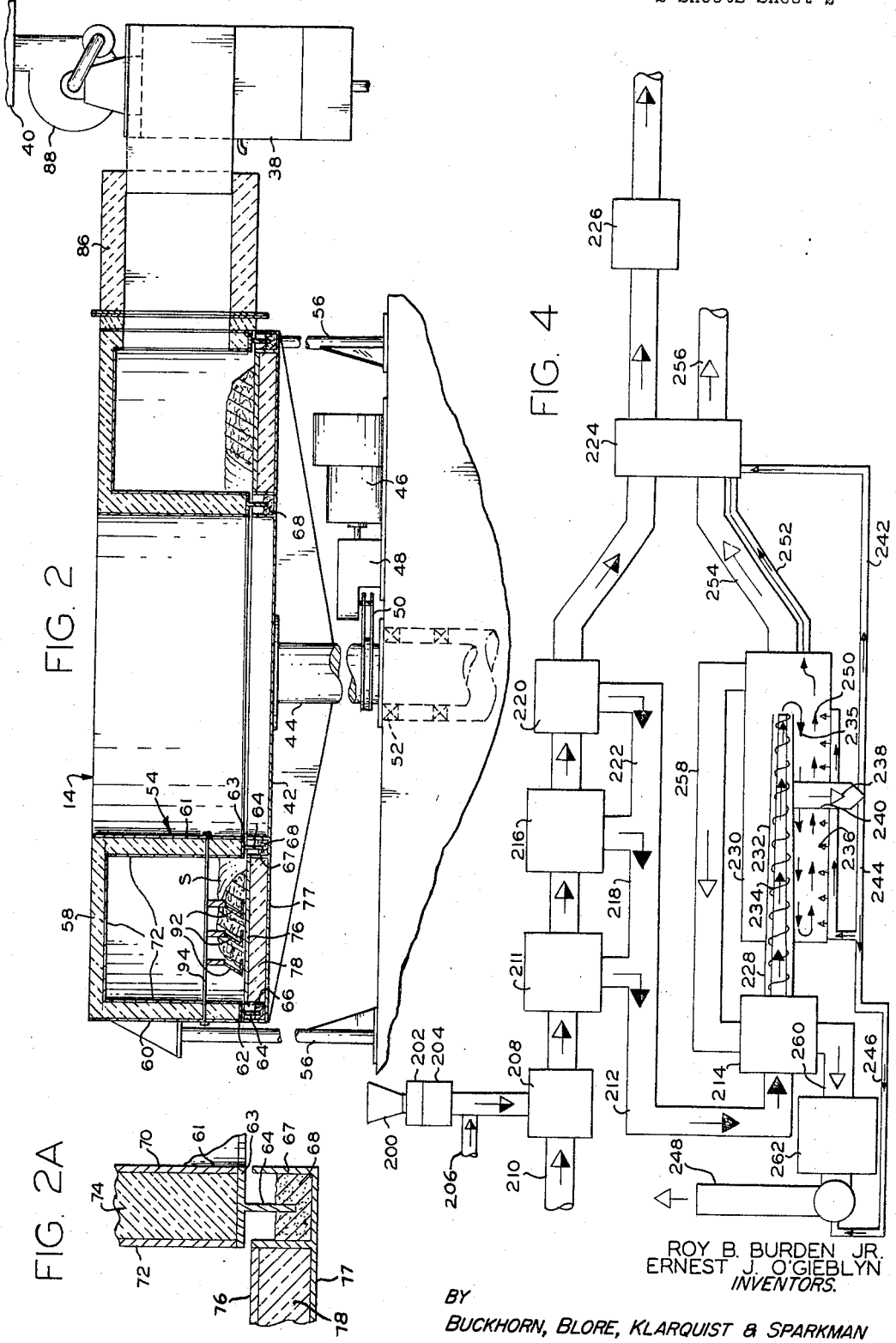

United States Patent Office 3,491,708
Patented Jan. 27, 1970

3,491,708
WET WASTE DISPOSAL METHOD, APPARATUS AND COMPONENTS
Roy B. Burden, Jr., Sherwood, and Ernest J. O'Gieblyn, Portland, Oreg., assignors, by mesne assignments, to General Incinerators of California, Inc., San Diego, Calif., a corporation of California
Continuation of application Ser. No. 658,808, Aug. 7, 1967. This application Jan. 13, 1969, Ser. No. 792,214
Int. Cl. F23g 5/02, 5/04
U.S. Cl. 110—8                                    12 Claims

ABSTRACT OF THE DISCLOSURE

This application discloses a system for destroying by burning wet waste materials such as sewage sludge, garbage, wood chips, paper, and general refuse. Central to the entire system is a rotary dryer which predries the material to be burned. The dryer includes a circular horizontal conveyor table which rotates at slow speed on a central shaft and an annular gas chamber which is stationarily mounted over an outer peripheral portion of the table so that the table forms the bottom wall of the chamber. Wet material to be burned is conveyed continuously from a dewatering station onto the table where it is conveyed at slow speed through a circular path to a discharge screw conveyor which moves the dried material continuously to a sludge burner. As the wet material rotates, warm furnace gases from the sludge burner pass through the gas chamber and thus over the surface of the material to dry the same. Plow devices within the chamber slowly stir the material as it moves to promote drying of the entire mass. After the furnace gases pass through the gas chamber, they are led into a gas scrubber and then to an afterburner, after which they are discharged to the atmosphere. Dried wastes may be led from the dryer to a hammermill or other comminuting device before they pass to the burner.

---

This application is a continuation of U.S. application Ser. No. 658,808, filed Aug. 7, 1967, now abandoned.

Two types of sludge burners are disclosed. In one type, the material is blown into the burner in suspension and burned while whirling in a stream of combustion air. The resultant furnace gases are then mixed with cooling air from the atmosphere to lower the temperature of the same before they pass into the dryer unit. In another type of burner, the dried sludge is conveyed through a burner tube where it is burned in the absence of air. As the material passes through the tube volatile hydrocarbons are withdrawn and used as auxiliary fuel to heat the tube and other components of the disposal system such as the afterburner or an activated carbon filter used for clarifying liquid components of the wet waste. Solid residue is discharged from the burner tube as charcoal and then recirculated through the furnace beneath the burner tube as a source of fuel for heating the tube. During this second pass through the furnace the charcoal is converted to activated charcoal. The activated charcoal then may be conveyed to the previously mentioned water filter to replenish the activated carbon in such filter. The gases from this furnace are also used as a source of heat for the dryer.

BACKGROUND OF THE INVENTION

Field of the invention

The present invention is particularly concerned with the disposal of wet wastes by burning and more particularly with a method and apparatus for predrying and then burning wet wastes.

Description of the prior art

The efficient disposal of wet wastes, such as sludges, has always been a problem. Disposal of sludge by open-air drying and storage requires long time and large areas of land, and furthermore is unsightly and creates unpleasant odors. The disposal of sludge by burning has heretofore required expensive equipment which many cities, manufacturers, and others have been reluctant to purchase because of its high cost. Moreover, the burning of sludge and other wet wastes by previous methods and in prior equipment has resulted in large quantities of solid, liquid and gaseous residues which themselves create disposal problems.

SUMMARY OF THE INVENTION

The above problems of the prior art are overcome by the present invention through the provision of an exceptionally efficient wet waste disposal system which includes a dryer which predries the waste material and other components which process the material so that it can be burned according to the most efficient of previously suggested methods of destroying ordinary dry waste materials. The effectiveness of the dryer resides in its ability to dry wet wastes completely, to a fluffy dry condition and in a continuous stream, without blowing the wet wastes into an air or other gas suspension which would create odor and smoke problems in the disposal of the drying gases. The system of the invention is exceptionally efficient in that it utilizes the furnace gases resulting from the burning of the predried sludges in the dryer unit. Furthermore, the system can incorporate a specific type of reduction furnace which enables the system to utilize solid and volatile hydrocarbon residues in the disposal system itself.

Primary objects of the invention are to provide:

(1) An exceptionally efficient system for destroying wet waste products by burning;

(2) A new and improved dryer for drying wet materials;

(3) A new and improved method of destroying sludges and other wet wastes by burning;

(4) A dryer as aforesaid which dries the wet materials in a continuous stream and without suspending the materials in the stream of drying gases;

(5) A system of disposing of wet wastes which is capable of utilizing the solid, liquid and gaseous residues of sludge burning in the disposal process;

(6) A new and improved integrated system for disposing of all solid and liquid wastes of a ship, building, or other given living or working unit wherein the liquid components of the wastes may be clarified for reuse or disposal and the solid and gaseous components of the wastes are utilized in the disposal system itself; and (7) A system and components which are economical to manufacture, operate, and maintain.

BRIEF DESCRIPTION OF THE DRAWINGS

The above and other objects and advantages of the present invention will become more apparent from the following detailed description which proceeds with reference to the accompanying drawings, wherein:

FIG. 1 is a schematic plan view of a wet waste disposal system, including a dryer, in accordance with the present invention;

FIG. 2 is a vertical sectional view on an enlarged scale of the dryer of FIG. 1, taken along the line 2—2 of FIG. 1;

FIG. 2A is an enlarged fragmentary section of a portion of the dryer of FIG. 2;

FIG. 3 is a vertical sectional view of the discharge end portion of the dryer of FIG. 1, taken along line 3—3 of FIG. 1; and FIG. 4 is a flow diagram of an integrated shipboard waste disposal system in accordance with the present invention.

DETAILED DESCRIPTION—EMBODIMENT OF FIGS. 1–3

(A) In general

With reference to the drawings, FIG. 1 discloses a wet waste disposal system including a dewatering device 10 such as a centrifuge from which wet sludge or other waste material is piped through a pipe 12 to a dryer unit 14. From the dryer unit, the dried sludge is conveyed by a screw conveyor 16 to a pipe 18 which feeds the sludge into a hammermill, slasher, or other comminuting means 20 where the sludge is reduced to a predetermined maximum size. From the comminuting means, the particulate dried sludge is blown by a blower 22 through a pipe 24 to a metering bin 26, which includes a screw conveyor 28 which meters the sludge at a predetermined rate into an intake pipe portion 30 of a primary burner 32. Burning of the sludge is completed in an incinerator 34 into which the primary burner is directed. The resultant furnace gases are conveyed through a large diameter tube 36 and into the dryer unit where they are utilized to dry incoming wet waste materials. After passing through the dryer, the furnace gases are discharged into a gas scrubber 38, from which the gases pass to an afterburner 40 before being discharged to atmosphere.

(B) Dryer

Referring to FIG. 2, dryer 14 includes a horizontally disposed circular conveyor table 42 mounted on a central vertical shaft 44 for rotation about its vertical axis. The table is rotated at relatively low speed by a variable speed motor 46 through a gear reducer 48 and a belt and pulley drive 50. The shaft is journaled in a suitable bearing structure 52. An annular open-bottomed gas chamber 54 is stationarily supported on legs 56 at a position overlying an outer peripheral portion of conveyor table 42. The gas chamber includes a top wall 58 and opposite vertical sidewalls 60 and 61. The uppermost surface of the conveyor table forms a moving bottom wall of the chamber. The lower ends of sidewalls 60, 61 terminate at T-shaped structural beams 62, 63, having depending flange portions 64 which extend downwardly into a pair of upwardly opening annular troughs 66, 67 which define the lateral limits of the sludge conveying portion of conveyor table 42. The troughs are at least partially filled with sand or some other suitable flowable material which forms a sand seal with flanges 64 of the chamber walls to prevent the escape of solids and gases from the chamber and yet permit relative rotation between the table and chamber. The details of this juncture between the chamber and conveyor table is shown most clearly in the enlarged framentary section of FIG. 2a.

Still referring to FIGS. 2 and 2a, the side and top walls of gas chamber 54 are composed of an outer metal shell 70 spaced from an inner metal lining 72. The space between the shell and lining is filled with a suitable insulating material 74. Similarly, conveyor table 42 between the troughs 66, 67 includes an upper annular metal plate 76 spaced from a lower circular base disc 77. The interior space between the plate and disc is filled with insulating material 78. Upper plate 76 of the conveyor table and inner lining 72 of the chamber are preferably formed of stainless steel. Stainless steel may be used in place of refractory brick because of the relatively low temperature of the drying gases that are circulated through the chamber. If high temperature gases at approximately 2,000 degrees F. or more were circulated through the gas chamber, a refractory brick would be required for the inner walls, and this would complicate the construction considerably.

The sludge S to be dried is carried by upper plate 76 of the table and is deposited thereon in a continuous stream by the pipe 12 leading from the centrifuge 10. As shown in FIG. 1, the wet sludge is deposited onto the conveyor table at an infeed end position 80 of the table and is rotated continuously and very slowly through a nearly 360 degree circular path as defined by the table until the sludge reaches an outfeed end 82 of the conveyor table as represented by the position of the discharge screw conveyor 16. During the travel of sludge S through this path, warm furnace gases at preferably 800 to 900 degrees F. enter the gas chamber at a gas inlet 84 through a sidewall opening of the chamber from tube 36. The warm gases also move in a clockwise direction through the gas chamber and thus pass over the sludge to dry the same until the gases reach a gas outlet passage 86 leading to gas scrubber 38. The gases are drawn through the gas chamber and into the gas outlet by an induced draft fan 88 just downstream from the gas scrubber. This fan is driven by a motor 91. The fan blows the cooled furnace gases entering the same from the scrubber into afterburner 40, which removes any noxious odors therefrom before exhausting the gases to atmosphere. The furnace gases are prevented from following a reverse course through the dryer and from recirculating through the dryer by a vertical damper 90 disposed in the chamber between the gas inlet and gas outlet. As shown in FIG. 3, the damper is vertically movable, and its lower edge floats on upper plate 76 of conveyor table 42 or on any material that might be carried by the table at this point.

As the table rotates slowly, a series of plows 92 suspended from rods 94 at intervals within the gas chamber gently stir the sludge to promote thorough drying of the entire mass. As shown in FIG. 3, when the sludge reaches the outfeed end of the conveyor table, the forward movement of the table carries the sludge up an inclined ramp 96. The motion of the table and added impetus of a rotating paddle member 98 driven by a motor 99 (FIG. 1) conveys the sludge from the ramp into a trough structure 100 suspended between opposite sidewalls of the chamber. Discharge screw conveyor 16 extends through an opening 102 in outer sidewall 60 of the gas chamber and into the trough to convey the dried sludge out of the chamber to hammermill 20. Screw conveyor 16 is driven by a motor 104 at its discharge end.

(C) Sludge burner

Comminuting means 20 may comprise a conventional hammermill, a slasher unit as illustrated and described in copending patent application Ser. No. 612,654, filed Jan. 30, 1967, for Method and Apparatus for Destroying Bulk Paper and Other Bulk Materials or any other suitable comminuting apparatus, depending on the nature of the waste material. The waste material discharged from the dryer is in a substantially moisture free, or fluffy dry condition so that thereafter it can be handled substantially like any other dry combustible waste material. Thus, as previously mentioned, it can be blown from the comminuting means to the metering bin 26 from which it is fed at a predetermined rate into primary burner 32.

The primary burner may be a so-called cyclo-tube burner of the type disclosed in the aforementioned patent application Ser. No. 612,654. Such a burner includes a cylindrical combustion chamber 106 having an inlet opening in an end portion 108 within which a burner ring (not shown) is disposed. The particulate dried sludge is blown by a fan 110 through the inlet opening and into the main chamber 106 in an air suspension, where it is whirled in a helical path by blades (not shown) at the inlet to the chamber and by jets of combustion air which are directed tangentially into the main chamber through tuyeres (not shown). Within the combustion chamber the whirling sludge particles are subjected to flame from the burner ring at temperatures in excess of 2,000 degrees F. Auxiliary fuel such as natural gas or oil is supplied to the burner ring through a supply pipe 112 from an external source, and combustion air is supplied to main chamber 106 and cooling air supplied to the burner ring by a blower 114 through a flow divider box 116 and pipe 118, the functioning of which will be understood more completely from an inspection of the aforementioned patent application.

From main chamber 106 of the primary burner, the burning sludge and its products of combustion are carried into the larger furnace 34 where combustion is completed. Furnace 34 may be a conventional four-pass incinerator of the type illustrated in the aforementioned patent application Ser. No. 612,654. Most of the solid residue, in the form of ash, if any, is settled out in this furnace. From there the gaseous products of combustion are conveyed through the connecting tube 36 to the gas chamber of the dryer. However, since the furnace gases as they leave furnace 34 will ordinarily be at too high a temperature for the stainless steel inner lining of the dryer, if in fact stainless steel is used, these gases are cooled prior to their entry into the dryer. This is accomplished by a fan 120 which injects cooling atmospheric air into the tube 36 and mixes it with the furnace gases to cool the gases from temperatures which may be in excess of 2,000 degrees F. to optimum temperatures approximating 1000 degrees F. and preferably ranging from about 800 to 900 degrees F., although this may vary depending on the moisture content of the material to be dried, the speed at which the dryer is rotated and the size of the dryer.

It is also desirable to provide the dryer with an auxiliary burner 122 as shown in FIG. 1 to preheat the dryer and any wet sludge therein prior to starting up the furnace so that the system will operate efficiently from the start. However, after the entire system is in operation so that furnace gases may be used to dry the incoming wet waste in the dryer, auxiliary burner 122 would be shut off.

As previously mentioned, furnace gases entering the dryer at inlet 84 are circulated through the gas chamber of the dryer and through gas outlet 86 and thence to the scrubber 38 where the gases are cooled and any solid residue settled out. Thereafter the cooled and cleansed gases pass into afterburner 40 and then are exhausted into the atmosphere. Gas scrubber 38 may be of any suitable type, but an example of a satisfactory type is disclosed in the aforementioned patent application Ser. No. 612,654. A suitable afterburner for use with the system is disclosed in copending application Ser. No. 480,405 filed Aug. 7, 1965, entitled Afterburner.

(D) Summary of operation

In operation the conveyor table is rotated at a speed of preferably 8 to 10 revolutions per hour although the speed may be varied considerably depending on the water content of the material, the temperature of the gases passing through the dryer, the size of the conveyor table and desired moisture content of the dried sludge. In any event, however, the table should be rotated at a speed and the gases circulated at speeds that will not carry the material being dried into suspension within the dryer to prevent air pollution and gas disposal problems. Wet sludge to be dried is conveyed in a continuous flow onto the table as it rotates, stirred gently by the plows as it is conveyed by the table, and then discharged continuously by the screw conveyor 16. Thereafter, the material is comminuted to a predetermined maximum size after which it is blown to the metering bin, from which it is metered and blown into a primary burner within which it is suspended in combustion air while being burned. The resultant furnace gases are then cooled slightly by intermixing the same with cooling atmospheric air, after which the gases at temperatures preferably slightly below 1000 degrees F. are circulated through the gas chamber of the dryer to dry the wet incoming sludge before such gases are cooled, cleansed and exhausted in a colorless, odorless and harmless condition.

DETAILED DESCRIPTION—EMBODIMENT OF FIG. 4

With reference to FIG. 4 there is diagrammed an integrated waste disposal system for a ship or other self-contained living or working unit capable of clarifying and reusing, if desired, the liquid components of the waste and utilizing the solid and gaseous components of the waste in the operation of the system itself. For example, the system as shown in FIG. 4 is capable of disposing of all solid and liquid shipboard waste including garbage, sewage, waste paper and general refuse. The flow of solids, liquids and gases through such system is represented by arrows. Those arrows having heads which are not filled in at all represent gas flow, while arrows having heads half filled in represent liquid flow and arrows having completely filled in heads represent the flow of solids through the system.

The system includes a general input 200 into which the ship's general refuse, including waste paper, is dumped. From there the refuse falls by gravity into a slasher unit 202 as described in detail in the aforementioned application Ser. No. 612,654, which reduces all refuse to particle form. From the slasher the material passes into a conventional hammermill 204 where the particles are further reduced in size. Water is added to the refuse through a pipe 206, and the resultant slurry is flushed to a grinder 208 where the general refuse is merged with the ship's garbage and sewage, which is added at an input 210. Grinder 208 may be of any suitable type consisting of a series of gears or blades which reduce the maximum size of the solid waste to a predetermined maximum size for further processing. From the grinder the combined waste is conveyed to a primary clarifier 211, which takes the form of a settling tank where the heavier solids are segregated from the liquid components of the waste. From the primary clarifier, the wet sludge is conveyed through a conduit 212 to a rotary drier 214 of the type previously described with reference to FIGS. 1 through 3. At the same time the liquid waste from the primary clarifier is conveyed to a secondary clarifier which may comprise a North screen or equivalent screen 216 well known in the art of water clarification where suspended solids are removed and passed through a conduit section 218 to the conduit 212 and thence to the drier 214. Liquid passing through secondary clarifier 216 flows to a vacuum filter 220 or the like. Such a filter may be of the type comprising a rotating drum having a perforate shell which retains fine solids but passes liquids. Solids retained by the vacuum filter are passed through a conduit portion 222, and through conduit sections 218 and 212 to the dryer 214 as with the solids from the previous stages. Liquid passing through the vacuum filter flows through an activated charcoal filter 224 where extremely minute suspended solids are removed from the water before it is passed through an automatic chlorinator 226 or other suitable water purification device. A process which is particularly suited for this phase of the system is the so-called trielectrode process well known in the art of water treatment. Water passing through chlorinator 226 can be further clarified if desired and reused, either in the ships' drinking water system if sufficiently purified, or for general nonconsumptive, utility purposes such as the flushing of wastes in the system itself.

Solids passing from the dryer 214 are screw conveyed by a conveyor 228 into a reduction type furnace 230 wherein the dried wastes are burned in the absence of oxygen. A furnace suitable for this purpose is shown and described in copending patent application Ser. No. 653,130, filed July 13, 1967, and entitled "Refuse Treatment." Essentially the furnace includes a stainless steel burner tube 232 through which the dried sludge is conveyed by a screw conveyor 234 while subjected to external heat applied to the outside of the tube by burning charcoal represented by the arrows 235 and auxiliary fuel represented by vertical arrows 236. As heat is applied to the material within the tube, volatile hydrocarbons, represented by arrow 238, are driven off and collected in passages represented by conduit 240. These volatile hydrocarbons are then transported through pipes 242 and 244 to the activated charcoal filter 224 and back to the reduction furnace, respectively, where they are used as auxiliary fuel to fire these components. A portion of the volatile hydrocarbons may also be transported through a pipe 246 and used to fire on afterburner 248 used in treating the exhaust furnace gases.

The material discharged from the outlet end of burner tube 232 is in the form of charcoal 235 which is recirculated beneath the burner tube 232 and actually used as fuel to heat the tube. This recirculation and further burning of the charcoal converts it to activated charcoal represented by the horizontal arrows 250. The activated charcoal may then be conveyed through passage 252 to the activated charcoal filter 224 and there used to replenish the supply of activated charcoal in such filter.

Exhaust gases from furnace 230 may be conveyed through a pipe 254 to the activated charcoal filter and used to reactivate such filter for discharge through a pipe 256. A portion of the furnace gases is also cooled slightly and conveyed through a pipe 258 back to the dryer 214, where it is used to dry the wet sludge entering the dryer through pipe 212 in the manner previously described with respect to the dryer of FIG. 1.

After passing through the dryer, the furnace gases are conveyed through a pipe 260 to a gas scrubber 262 which may be of the same type used in the system of FIG. 1. From there the cooled and cleansed furnace gases are conveyed to the previously mentioned afterburner 248 for removal of noxious fumes before exhausting the gases to atmosphere.

From the foregoing described shipboard system it will be appreciated that both the liquid and the solid components of the shipboard waste may be recirculated in the system to promote the efficient operation of the same. The result is a system which produces liquid effluent of any clarity desired, activated charcoal as the only solid residue, which can be used in the activated charcoal filter, and gases used as auxiliary fuel for the furnace, dryer and activated charcoal filter.

Instead of the reduction furnace described, the system can incorporate a primary burner and incinerator such as the type shown and described with respect to FIG. 1 which burns the dried sludge in an oxidizing atmosphere. However, if such a sludge burner is used, a comminutor would be placed in the passage 228 connecting the dryer with the furnace, together with a blower for blowing the material into the primary burner. Furthermore, an independent supply of activated charcoal would have to be carried abroad ship to replenish the activated charcoal filter 224.

Having illustrated and described two preferred embodiments of the invention, it should be apparent to those skilled in the art that the same permits of modification in arrangement and detail. We claim as our invention all such modifications as come within the true spirit and scope of the following claims.

We claim:
1. A method of destroying wet combustible waste materials such as sludge comprising:
drying said waste material by constantly conveying en masse said wet material along a predetermined, confined and substantially horizontally disposed path while constantly passing a stream of warm gases through the confined path directly over the mass until the material is converted to a substantially moisture free condition,
controlling the relative speeds of movement of the material through the confined path so that the material remains out of suspension in the gas stream,
comminuting the waste material,
then burning the comminuted dry waste material,
continuously removing the gases which are cooled in the confined path during the drying step,
cleansing the removed gases,
and discharging the cleaned gases to atmosphere.
2. A method according to claim 1, wherein the wet waste material is dewatered to contain at least about twenty-five percent solids by weight before drying the same.
3. A method according to claim 1, wherein the hot gaseous products of burning are partly cooled and thereafter passed into contact with the wet waste material.
4. A method according to claim 1 wherein the waste material is comminuted after being dried, then blown into air suspension and then burned while being maintained in suspension.
5. A method according to claim 1 wherein the wet waste material to be dried is gently stirred in the confined path as the stream of warm gases are passed over the material to dry the same.
6. A method according to claim 1, wherein all of the dried waste material, after being comminuted, is conveyed directly to a burner to complete the burning step.
7. A method according to claim 3 wherein the dried comminuted waste material is burned at temperatures in excess of 2,000 degrees F. and wherein the hot gaseous products of combustion are cooled to a temperature of approximately 1,000 degrees F. or less before using the same to dry the wet waste material.
8. A method according to claim 4 wherein the dried comminuted waste material is whirled along a helical path in a stream of combustion air during the burning of the same.
9. A wet waste disposal system comprising in combination:
wet waste input means,
grinding means downstream from said input means for reducing the maximum size of solid wastes introduced into said input means,
segregating means downstream from said input means for separating the wet solid components from the liquid components of said wet waste to form a sludge,
rotary dryer means downstream from said segregating means for drying said sludge to a substantially moisture free condition,
sludge burner means downstream from said dryer means including means for introducing dried sludge from said dryer means into said burner means and means for burning said sludge,
means for conveying warm gaseous products of burning from said burner means to said dryer means for use in drying the wet sludge entering said dryer means,
gas cleansing means downstream from said dryer means for removing suspended solids and odors from gases passing from said dryer means before exhausting the same to atmosphere,
liquid clarifying means downstream from said segregating means and connected to said cleansing means.
10. A system according to claim 9, wherein said clarifying means includes an activated charcoal filter means and said burner means includes a reduction type furnace means for converting the dried sludge to charcoal, means for recirculating said charcoal through said burner means while burning the same to heat said furnace means and convert said charcoal to activated charcoal for use in said activated charcoal filter means, and means for collecting volatile hydrocarbons from the waste during the burning thereof to produce charcoal and for using said hydrocarbons as auxiliary fuel to heat said charcoal.

11. A system according to claim 9, including liquid purifying means downstream from said filter means and means for recirculating the purified liquid through said system at said waste input.

12. A wet waste disposal system comprising in combination:
wet waste input means,
grinding means downstream from said input means for reducing the maximum size of solid wastes introduced into said input means,
segregating means downstream from said input means for separating the wet solid components from the liquid components of said wet waste to form a sludge,
means forming a confined and substantially horizontally disposed drying chamber lying downstream from said segregating means for drying said sludge to a substantially moisture free condition,
sludge burning means disposed downstream from said chamber,
means for conveying dried sludge from the chamber to the burning means,
means for conveying warm gaseous products of burning through said chamber and above the sludge therein,
gas cleansing means downstream from said chamber for removing suspended solids and odor from the gases passing from the chamber before exhausting the same to atmosphere.

References Cited

UNITED STATES PATENTS

| | | | |
|---|---|---|---|
| 1,172,526 | 2/1916 | Benjamin | 34—185 |
| 1,817,228 | 8/1931 | Bliss | 110—8 |
| 1,952,389 | 3/1934 | Staples | 110—8 |
| 2,066,418 | 1/1937 | O'Mara | 110—8 |
| 2,102,427 | 12/1937 | Lloyd et al. | 110—8 |
| 2,254,953 | 9/1941 | Thomas | 110—8 |
| 2,271,157 | 1/1942 | Badenhausen | 110—7 |
| 3,124,086 | 3/1964 | Sage et al. | 110—7 |
| 3,322,079 | 5/1967 | Komline et al. | 110—8 |

KENNETH W. SPRAGUE, Primary Examiner

U.S. Cl. X.R.

110—15